May 31, 1927.

J. W. DOYLE

DRILL MECHANISM

Filed April 19, 1926

1,630,528

INVENTOR
John W. Doyle.
BY
Frank Warren
ATTORNEY

Patented May 31, 1927.

1,630,528

UNITED STATES PATENT OFFICE.

JOHN W. DOYLE, OF SEATTLE, WASHINGTON.

DRILL MECHANISM.

Application filed April 19, 1926. Serial No. 102,933.

My invention relates to improvements in drill mechanism of the form in which a drill is operated in substantially horizontal position and the object of my invention is to provide means for adjustably supporting a drill and its driving mechanism so that it may be moved into any desired position relative to an object that is to be drilled.

Another object is to provide means for supporting a drill so that it may be moved around a cylindrical piece of work and caused to drill holes radially of said work and so that it may further be moved in a straight line for drilling straight or non-cylindrical objects that are heavy and difficult to move.

Another object is to provide a drilling device that is adapted to be moved along or around work to be drilled and said drilling device having suitable means for support and for accurate alignment of said drilling device.

I accomplish these objects by devices illustrated in the accompanying drawings, wherein—

Figure 1 is a plan view of my invention showing its application to the drilling of work of a cylindrical nature.

Fig. 2 is a sectional view in elevation of the same.

Referring to the drawings throughout which like reference numerals indicate like parts, the numeral 5 designates a standard type of drill disposed in a manner to permit its rotation by the driving mechanism 6 and adapted to be forced into the work by means of the pressure feeding mechanism 7 acting against the supporting member 8.

The driving mechanism 6 and the pressure feeding mechanism 7 are so related and held together by the frame 9 that they constitute a complete drilling mechanism and as a unit are capable of movement up and down the cylindrical supports 10 and 11 by means of the frame 9 being slidably mounted thereon.

A top plate 12 and a bottom plate 13 serve to hold the supporting member 8 and cylindrical supports 10 and 11 together in a manner to form a frame structure suitable for supporting the drilling mechanism.

Securely mounted on the top plate 12 is an L-shaped bracket member 14 arranged to carry the weight of the frame structure formed by the supporting member 8, supports 10 and 11 and plates 12 and 13. A flanged wheel 15 turning on a pin 16 that is rigidly mounted on the bracket 14 rolls on a track 17.

A substructure composed of T-beams 18, 19 and 20 arranged as shown in Fig. 1 serves to support a work table 21 and said beams are also arranged to carry upright members 22 shown in Fig. 2 that are connected with the track 17 by members 23 and serve to support said track.

The upright members 22 are located far enough away from the track 17 to permit the stop member 8 to pass unobstructed so as to allow the movement of the drilling mechanism to any desired position along the track 17.

Four rollers 25 are positioned on the bottom plate 13 in a manner to form a lower guide and support for the frame structure composed of the stop member 8, cylindrical supports 10 and 11 and plates 12 and 13. An angle bar 26 secured to the table 21 and arranged to conform in shape to the track 17 forms a track for the rollers 25.

To facilitate the movement of the drilling mechanism a counter weight 27 is arranged to balance the same by means of the cord 28 attached to the driving mechanism 6 and the said cord passes over a pulley 29 and is securely fastened to the counter weight 27.

Where the shape of the work is cylindrical the track 17 is preferably circular in form providing a free and unobstructed movement of the drilling mechanism around such work. The track 26 necessarily conforms in shape to the track 17 thereby providing accurate alignment of the drilling mechanism by allowing the movement of the lower plate 13 to be exactly the same as the movement of the top plate 12.

When the work is of a nature requiring holes to be drilled in a large heavy beam, girders or the like, my invention provides that the tracks 17 and 26 be arranged in a manner to permit the drilling mechanism to be moved along the work substantially in a horizontal or vertical direction thereby eliminating the necessity of using cranes or lifting machinery for the same while the drilling operations are in progress.

The operation of my invention is as follows:

Rotary motion is imparted to the drill 5 by means of the driving mechanism 6 and pressure against the said drill is exerted by means of the feeding mechanism 7 acting against the member 8. The drill is thereby brought into contact with the cylinder 31 and is caused to drill a hole therein.

The cylinder 31 is positioned on the table 21 with its center 30 coincident with the center about which the drill moves so that any hole drilled by said drill 5 in the cylinder 31 will be radial relative to said center 30. Holes drilled radially from the center are very desirable in the case of riveted boilers and other work where accurate alignment is essential.

When pressure is applied to the drill 5 against the cylinder 31 there is a tendency to force the bottom plate 13 out from the track 26. Two of the rollers 25 are placed on the inside of the track 26 to resist this tendency and also serving to accurately locate the radial position of the drilling mechanism and insure the perpendicular position of the said drilling mechanism with respect to the cylinder 31.

The other two rollers 25 placed outside of the track 26 serve to prevent the plate 13 and its relative frame work from swinging in toward the table 21.

From the accompanying drawings and the foregoing description the advantages of construction and adaptability of my invention makes it obvious that modifications will occur to those skilled in the art to which my invention appertains and such changes may be made without departing from the spirit of my invention.

What I claim is:

Apparatus of the class described embodying a work support, an arcuate trackway formed around one edge of said work support, another arcuate trackway positioned above said work support a frame supported and guided for arcuate movement by said trackways, a power operated drill unit carried by said frame and adjustable vertically thereon, means for counter balancing the weight of said drill unit, and a substantially horizontal drill in said drill unit supported with its axis directed toward the vertical axis of the center of curvature of said trackways for all positions of said drill unit on said arcuate trackways.

In witness whereof, I hereunto subscribe my name this 14th day of April, A. D. 1926.

JOHN W. DOYLE.